REGULATED POWER SUPPLY UTILIZING A GATE TURN OFF SWITCH

Filed Feb. 18, 1965

INVENTORS
SOL GREENBERG
IRVING FORREST

United States Patent Office 3,525,033

Patented Aug. 18, 1970

3,525,033

REGULATED POWER SUPPLY UTILIZING A GATE TURN OFF SWITCH

Sol Greenberg, 23 Ridge Drive, Port Washington, N.Y. 11050, and Irving Forrest, 21 Evelyn Road, Plainview, N.Y. 13137

Filed Feb. 18, 1965, Ser. No. 433,594

Int. Cl. G05f 1/44

U.S. Cl. 323—22 4 Claims

ABSTRACT OF THE DISCLOSURE

A regulated power supply including a gate turn-off switch (GTO) as a main regulating element. A positive pulse is applied to the GTO to render it conductive when the output falls below a predetermined level and a negative pulse is applied to the GTO to render it nonconductive when the output level exceeds a predetermined value, so that regulation is achieved by controlling the periods of both the conductive and nonconductive states of the GTO.

This invention relates to regulating systems for power supplies, and more particularly to regulating systems of the pulse type.

Many of the existing regulating systems are basically of the pulse type including a switching device, such as a power transistor or silicon controlled rectifier, connected between an unregulated electrical source and the load. These switching devices are controlled in on-off fashion by means of associated control circuits which operate in response to an electrical parameter at load such as load current or potential across the load. Regulation is usually achieved by varying the pulse width or pulse repetition rate in accordance with the load requirements.

Although power transistors and controlled rectifiers have been successfully employed in prior regulating systems, both of these semiconductor devices have serious limitations. A transistor is inherently a low voltage device and cannot readily absorb switching transients, particularly transients which result when inductive loads are being supplied. A controlled rectifier on the other hand, is inherently a high voltage device, but due to its latching characteristic it is difficult to commutate or render nonconductive.

Thus, it is an object of this invention to provide an improved regulated power supply system of the pulse type which is not effected by limitations inherent in prior systems.

Another object is to provide a regulating system for a power supply which employs a new high voltage semiconductor device, the conductive state of which can be controlled by means of its control element.

Yet another object is to provide a new regulating system including a controlled circuit which can effectively operate an internally regenerative semiconductor device via its control element.

Still another object is to provide a regulating system of the pulse type where control is achieved by varying both the pulse width and the pulse repetition rate.

The manner in which the foregong and other objects are achieved in accordance with this invention is described in greater detail in the following specification which sets forth a few illustrative embodiments. The drawings form a part of this specification wherein.

The main switching device utilized in the regulating systems in accordance with this invention is a three element (anode, cathode and gate) PNPN internally regenerative semiconductor referred to as a gate turn off switch or GTO. The GTO is bistable in operation and is either fully conductive or fully nonconductive without having any intermediate partially conductive states. If a positive pulse is applied to the gate element, i.e., positive at the gate with respect to the cathode, the GTO becomes conductive and thereafter remains conductive even though the gate signal is removed. The gate region of the GTO has a relatively large effective area and is designed so that a negative pulse applied to the gate can render the device nonconductive. In essence, this is achieved by extracting sufficient current from the gate element to thereby terminate the internal regeneration. The current gain between the anode, cathode and the gate is substantial both during turn on and turn off and, hence, large anode currents can be effectively controlled by means of relatively small gate signals.

Regulation is achieved in accordance with this invention by comparing the potential appearing across the load with a reference signal to thereby obtain a control signal. The GTO is connected in series with the load. If the potential across the load exceeds a predetermined value, the GTO is turned off, and if the potential across the load drops below this predetermined value, the GTO is turned on. Thus, the output potential fluctuates between a potential slightly above and slightly below the desired predetermined output value. The control circuit includes a Schmitt trigger circuit coupled to the gate element of the GTO. In cases where finer regulation is desired, a differential amplifier is coupled to the input of the Schmitt circuit.

Figure 1:
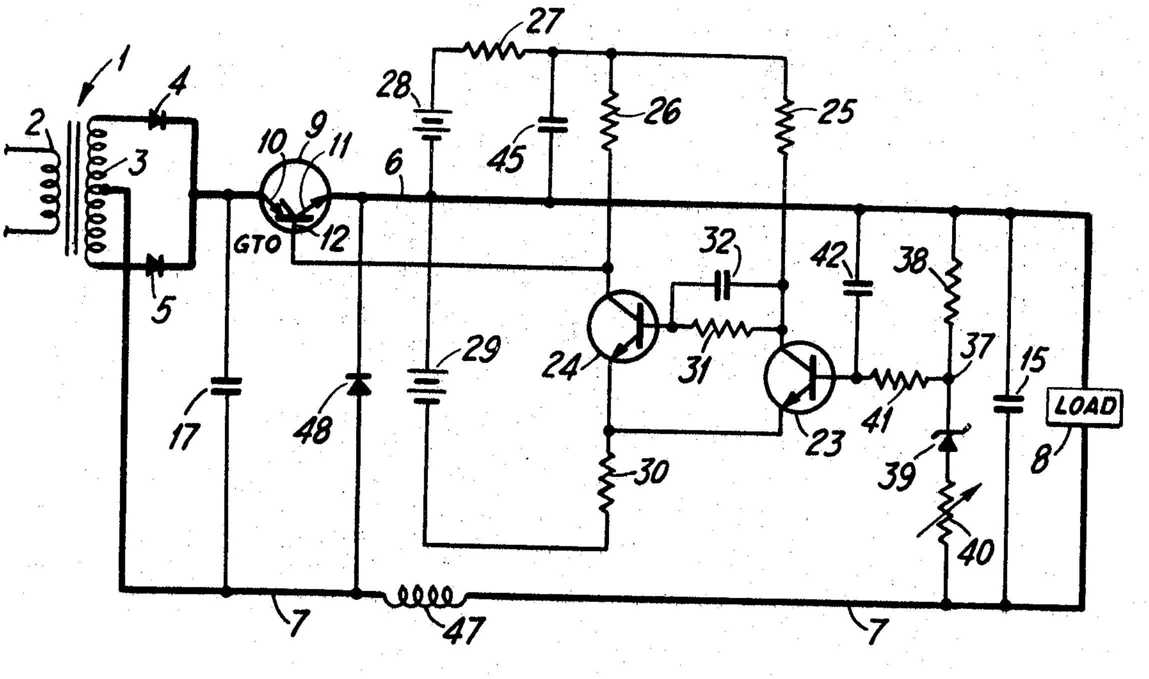
FIG. 1 is a schematic diagram of regulated power supply in accordance with one embodiment of the invention.

Referring to FIG. 1, the regulating power supply includes a transformer 1, having a primary winding 2 connected to a suitable alternating current source and a centered tapped secondary winding 3. The ends of secondary winding 3 are connected, respectively, to the anodes of semiconductor diodes 4 and 5, and the common cathode junction of these diodes is coupled via a GTO 9 to the load 8 by means of a positive supply conductor 6. The center tap on winding 3 is connected to the other side of load 8 via a negative supply conductor 7.

GTO 9 is connected in conductor 6 with its anode 10 connected to the common cathode junction of diodes 4 and 5, and its cathode 11 directly connected to load 8. A capacitor 15 is connected across the load and a capacitor 17 is connected between the common cathode junction of diodes 4 and 5 and conductor 7. Current flow from the transformer-rectifier combination and capacitor 17 to the load and capacitor 15 is controlled by the conductive state of GTO 9. The capacitors perform the usual storage function to fill in between successive line frequency pulses applied to the capacitor.

The control circuit for operating the GTO includes a pair of NPN type transistors 23 and 24 interconnected to form a Schmitt trigger circuit. The emitters of transistors 23 and 24 are connected to the negative terminal of a potential source 29 (shown as a battery for convenience) via a common emitter resistor 30. The collectors of transistors 23 and 24 are connected to the positive terminal of a potential source 28 via their respective collector resistors 25 and 26 and a common resistor 27. A resistor 31 is connected between the collector of transistor 23 and the base of transistor 24 and a bypass capacitor 32 is connected in parallel with resistor 31 to thereby complete the trigger circuit.

The input signal for the trigger circuit is provided by a voltage divider including a Zener diode 39, the cathode of the diode being connected to conductor 6 via resistor 38, and the anode of the diode being connected to conductor 7 via a variable resistor 40. The base of transistor 23 is connected to junction 37 via a resistor 41 and to conductor 6 via a capacitor 42.

The collector of transistor 24 is connected to base 12 of GTO 9. A capacitor 45 is connected between conductor 6 and the junction between resistors 25, 26 and 27. When transistor 24 is conductive the base of the GTO is, in effect, coupled to the negative terminal of source 29 and, therefore, the GTO is rendered nonconductive. When transistor 24 becomes nonconductive, the base of GTO 9 is coupled to capacitor 45 which then discharges providing a positive pulse which renders the GTO conductive.

In explaining the operation of the regulating system it is convenient to consider the various potentials with respect to the positive supply conductor 6 since potential sources 28 and 29 are both referenced to conductor 6. Accordingly, if the output potential across the load increases, conductor 7, junction 37 and the base of transistor 23 all become increasingly negative. Eventually transistor 23 becomes conductive and, because of the common emitter regenerative coupling, soon renders transistor 24 fully conductive. When transistor 24 becomes conductive, the base of GTO 9 is driven negative and, therefore, the GTO becomes nonconductive. Under these circumstances capacitor 15 supplies energy to load 8, and as the capacitor discharges the potential across the load gradually decreases.

As the potential across the load decreases, the potentials at conductor 7, junction 37 and the base of transistor 23 become increasingly positive which in turn renders transistor 23 conductive and transistor 24 nonconductive. As a result, capacitor 45 discharges thereby supplying a positive pulse which renders the GTO conductive. Once rendered conductive, the GTO remains conductive and permits current flow from capacitor 17 to capacitor 15 and the load.

Accordingly, the load is supplied via capacitor 15 by means of a series of pulses which are created as the GTO turns on and off. The width of the pulses and the repetition rate varies in accordance with the load requirements and thereby maintains the output potential across capacitor 15 substantially constant.

A choke coil 47 is connected in conductor 7 to limit current flow through GTO 9 when conductive and to maintain the current flow at a level which can conveniently be turned off by the GTO. The anode of a diode 48 is connected to the source end of coil 47 and the cathode thereof is connected to conductor 6 at the cathode 11 of the GTO. Diode 48 provides a path for current flow as the magnetic field in coil 47 collapses. Thus, the energy in coil 47 passes through diode 48 and is supplied to capacitor 15 and load 8 thereby minimizing power losses.

Figure 2:
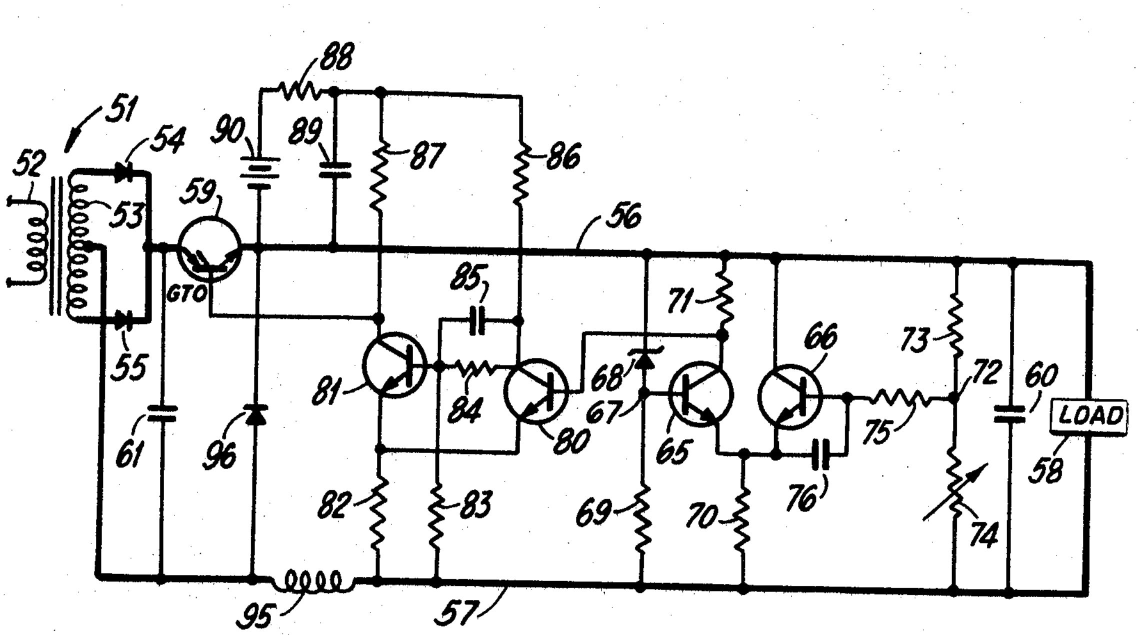
FIG. 2 is a schematic diagram of a regulated power supply in accordance with this invention which is designed to achieve very fine regulation.

Another embodiment of the invention including a differential amplifier in addition to the Schmitt trigger circuit is shown in FIG. 2. The power supply system includes a transformer-rectifier arrangement comprising a transformer 51 with a primary winding 52 connected to an alternating current source and a secondary center tapped winding 53. A pair of semiconductor diodes 54 and 55 are connected to the ends of the secondary winding. The common cathode connection of these diodes is connected to a load 58 via a positive conductor 56 including GTO 59 connected in series therein. The other side of load 58 is connected to the center tap of winding 53 by means of a negative lead 57. Capacitors 60 and 61 are connected between conductors 56 and 57 and, respectively, across the load and the transformer-rectifier circuit.

The differential amplifier includes two NPN type transistors 65 and 66. The emitters of the transistors are connected to negative lead 57 via a common emitter resistor 70. The collector of transistor 66 is directly connected to positive conductor 56 and the collector of transistor 65 is connected to conductor 56 via a collector resistor 71. A reference potential is provided by a Zener diode 68. The cathode of Zener diode 68 is connected to conductor 56 and the anode thereof is connected to the base of transistor 65 and negative conductor 57 via resistor 69. A signal representative of the potential across load 58 is developed by a voltage divider connected between leads 56 and 57 including a resistor 73 connected in series with a variable resistor 74. A junction 72 between resistors 73 and 74 is coupled to the base of transistor 66 via a resistor 75.

When the potential at junction 72 on the voltage divider is positive with respect to the reference potential at junction 67 (anode of Zener diode 68), transistor 66 becomes conductive and transistor 65 nonconductive. Conversely, if the potential at junction 72 is negative with respect to the potential at junction 67, transistor 66 becomes nonconductive and transistor 65 conductive.

The output of the differential amplifier is connected to the input of the Schmitt trigger circuit including NPN type transistors 80 and 81. The collector of transistor 65 of the differential amplifier is connected to the base of transistor 80 and the collector of transistor 80 is connected to the base of transistor 81 via a resistor 84 and its parallel bypass capacitor 85. The emitters of transistors 80 and 81 are connected to conductor 57 via a common emitter resistor 82 and the base of transistor 81 is coupled to conductor 57 via a resistor 83. The collectors of transistors 80 and 81 are coupled to the positive terminal of a potential source 90 via their respective collector resistors 86 and 87 and a common resistor 88. The negative terminal of potential source 90 is connected to conductor 56.

The collector of transistor 81 is connected to the gate of GTO 59. Therefore, when the potential at the input of the trigger circuit becomes positive, transistor 80 is rendered conductive and transistor 81 is rendered fully nonconductive. Accordingly, the potential at the collector of transistor 81 is driven negative thereby rendering GTO 59 nonconductive. A capacitor 89 is connected between the junction of resistors 86, 87 and 88 and conductor 56. Therefore, when transistor 81 is rendered nonconductive in response to a negative signal at the input of the trigger circuit, capacitor 59 discharges to provide a positive pulse at the gate of the GTO to thereby render the GTO conductive.

Again, when considering the operation of the entire system it is desirable to consider potentials with reference to positive conductor 56, since the cathode of Zener diode 68 which provides the reference potential is connected to conductor 56. When the potential across load 58 increases, junction 72 of the voltage divider is driven negative with respect to the reference potential at junction 67. Therefore, transistor 66 ultimately becomes nonconductive and transistor 65 becomes conductive thereby providing a negative potential at the input of the trigger circuit at the base of transistor 80. This negtaive potential renders transistor 80 nonconductive and transistor 81 conductive so that the gate of the GTO becomes negative to thereby render the GTO nonconductive. Accordingly, the load is then energized from capacitor 60, and as the capacitor discharges, the potential across the load gradually decreases.

When the potential across the load has dropped to a value slightly below the desired value (as selected by the adjustment of resistor 74) junction 72 becomes positive with respect to junction 67. As a result, transistor 65 and the differential amplifier is rendered nonconductive which in turn renders transistor 81 in the trigger circuit nonconductive. Therefore, capacitor 85 discharges to provide a positive pulse at the gate of GTO 59. The GTO in turn couples the transformer-rectifier circuit and capacitor 60 and load 58. Energy is transferred through the GTO until such time as the potential across the load exceeds the desired value to thereby initiate the action which renders the GTO nonconductive.

A choke coil 95 is connected in conductor 57 and a semiconductor diode 96 is connected between conductors 56 and 57. These components perform essentially the same function as coil 47 and diode 48 in FIG. 1.

Although only a few illustrative embodiments of the invention have been described in detail, it should be obvious that there are numerous variations within the scope and spirit of the invention. The invention is more particularly defined in the appended claims.

What is claimed is:

1. A regulated power supply for providing a regulated DC output to a load from an unregulated DC source, comprising:

- an internally regenerative semiconductor device having an anode, a cathode and a control element and characterized by
- a fully conductive state subsequent to application of a pulse of one polarity to said control element, and
- a fully nonconductive state subsequent to application of a pulse of the opposite polarity to said control element;
- circuit means for connecting said device between the unregulated source and the load to control the flow of current from the unregulated source in accordance with the conductive state of said device;
- means for providing a potential which is negative with respect to said cathode;
- a second semiconductor device for coupling said control element to said negative potential when conductive;
- second circuit means for supplying a positive signal to said control element when said second semiconductor device becomes nonconductive, and
- control circuit means for controlling the periods of both said conductive and nonconductive states by rendering said second semiconductor device
  - nonconductive when the potential across the load exceeds a predetermined value, and
  - conductive when the potential across the load drops below a predetermined value.

2. A regulated power supply in accordance with claim 1 wherein said second circuit means comprises a capacitor which is discharged to supply a positive pulse to said control element when said second semiconductor device is rendered nonconductive.

3. A regulated power supply in accordance with claim 1 further comprising a voltage divider connectable across the load and wherein said control circuit is a trigger circuit including said second semiconductor device and coupled to said voltage divider.

4. A regulated power supply in accordance with claim 3 further comprising a reference potential and a differential amplifier connected between said trigger circuit and said voltage divider to compare the signal from said voltage divider with said reference potential.

References Cited

UNITED STATES PATENTS

| | | | |
|---|---|---|---|
| 3,173,077 | 3/1965 | Kirk et al. | 322—28 X |
| 3,331,008 | 7/1967 | Bedford | 321—2 |
| 3,346,802 | 10/1967 | Biet. | |

ORIS L. RADER, Primary Examiner

H. HUBERFELD, Assistant Examiner

U.S. Cl. X.R.

307—252, 305; 321—18